United States Patent [19]

van Duijn

[11] Patent Number: 5,198,398
[45] Date of Patent: Mar. 30, 1993

[54] METHOD FOR REGENERATING SPENT ACTIVATED CARBON AND PORTABLE CONTAINER FOR USE THEREIN

[75] Inventor: Eddy van Duijn, Marshall, Tex.

[73] Assignee: American Norit Company, Inc., Atlanta, Ga.

[21] Appl. No.: 678,832

[22] Filed: Apr. 2, 1991

[51] Int. Cl.⁵ .................. B01J 20/34; B01J 38/02; B01D 24/44; B65G 65/46

[52] U.S. Cl. .................. 502/56; 210/189; 210/270; 210/675; 210/676; 220/1.5; 222/413; 414/326; 414/332; 502/34; 502/55

[58] Field of Search .......... 502/56, 55, 34, 22; 210/189, 675, 676

[56] References Cited

U.S. PATENT DOCUMENTS

| | | | |
|---|---|---|---|
| 1,971,895 | 8/1934 | Andrews | 502/34 |
| 3,194,683 | 7/1965 | Grosvenor, Jr. et al. | 210/189 |
| 3,512,639 | 5/1970 | Kugelman et al. | 210/189 |
| 3,801,514 | 4/1974 | Joseph | 201/31 |
| 3,852,038 | 12/1974 | Corson | 423/449 |
| 4,127,737 | 11/1978 | Hirakawa | 502/55 |
| 4,165,289 | 8/1979 | Borst et al. | 210/676 |
| 4,338,198 | 7/1982 | Brown | 210/673 |
| 4,347,156 | 8/1982 | Lombana et al. | 34/168 |
| 4,416,798 | 11/1985 | Hager et al. | 502/420 |
| 4,421,243 | 12/1983 | Taquoi | 220/1.5 |
| 4,832,561 | 5/1989 | Nijenhuis | 414/500 |
| 4,848,617 | 7/1989 | Zygaj | 220/1.5 |
| 4,946,068 | 8/1990 | Erickson et al. | 222/23 |
| 4,957,721 | 9/1990 | Lonsinger et al. | 423/461 |

OTHER PUBLICATIONS

Promotional literature for Mega Mix U.S.A., 4450 North 12th St., Suite 118, Phoenix, AZ 85014.

Primary Examiner—Paul E. Konopka
Attorney, Agent, or Firm—Jones & Askew

[57] ABSTRACT

A relatively simple and more economical method for regenerating activated carbon wherein at least partially spent activated carbon is fed from a portable container directly to a heating zone without the use of liquid to transport the at least partially spent activated carbon to the heating zone. A portable container for use in the activated carbon regeneration method can be used to hold the activated carbon during adsorption processes, during storage of the activated carbon, and during transportation of the activated carbon between an adsorption site and a regeneration site. In the activated carbon regeneration method, the portable container is preferably positioned adjacent a conveyor so that the spent activated carbon can be delivered directly to the conveyor with an auger. The spent activated carbon is then fed directly to the heating zone with the conveyor.

12 Claims, 6 Drawing Sheets

METHOD FOR REGENERATING SPENT ACTIVATED CARBON AND PORTABLE CONTAINER FOR USE THEREIN

TECHNICAL FIELD

This invention generally relates to the regeneration of spent activated carbon. More specifically, this invention relates to the regeneration of spent activated carbon at regeneration sites remote from the adsorption sites at which the activated carbon is used and to more controlled handling of the spent activated carbon during transportation, storage and regeneration.

BACKGROUND OF THE INVENTION

Activated carbon is normally used to absorb and separate contaminants from liquids or gases flowing through the activated carbon. The majority of activated carbon is used to absorb materials from liquids in so-called "wet" applications. In a typical wet adsorption process, the activated carbon is formed into a bed in an adsorption vessel chamber, and the liquid to be treated is flowed through the bed. Materials in the liquid adhere to the surface of the activated carbon and remain in the carbon bed while the liquid flows through the bed and out of the vessel.

Eventually, the activated carbon used in adsorption systems becomes spent. Spent carbon may be replaced by new activated carbon or regenerated activated carbon. It is often more economical to regenerate the spent activated carbon than to replace the activated carbon with new material. Generally described, the regeneration of activated carbon involves heating the carbon to about 800° to 1000° C. in a furnace or kiln in a reducing environment which is normally steam. However, current activated carbon regeneration systems also must use a substantial amount of auxiliary equipment for carbon handling and environmental control.

Activated carbon regeneration may be conducted at the adsorption site or at a regeneration site remote from the adsorption site. Off-site regeneration is preferred for many activated carbon users, especially users of relatively small amounts of activated carbon, because of the large capital expense required in constructing a regeneration facility, relatively infrequent use of the regeneration facility by a single activated carbon user, environmental regulations which must be followed, and the knowledge and experience required to operate a regeneration facility.

Current environmental regulations dealing with activated carbon regeneration set forth many requirements, but one of the more significant requirements is that the whereabouts of the spent activated carbon, particularly activated carbon containing hazardous waste, be monitored. When off-site activated carbon regeneration facilities are used, monitoring the location of the activated carbon becomes more difficult, because the spent activated carbon must be transported from the adsorption site to the regeneration site. The spent activated carbon is then normally stored until it can be sent through the regeneration process. When hazardous wastes are involved, the spent activated carbon must be regenerated without being intermixed or commingled with other spent activated carbons. Thus, additional storage facilities at the regeneration site are required. In addition, monitoring the location of the spent activated carbon is difficult when the regeneration facility has a complicated carbon handling scheme.

Conventional activated carbon regeneration systems include a substantial amount of auxiliary equipment in addition to the kiln in which the activated carbon is actually regenerated. This auxiliary equipment is mostly used for carbon storage and handling and for environmental control. For example, most conventional activated carbon regeneration systems include a relatively complicated carbon storage and transfer system wherein the carbon is conveyed by means of a liquid transport medium such as water. Typically, the spent activated carbon is delivered in a bulk trailer to the regeneration site. The carbon is removed from the bulk trailer, mixed with water to form a slurry, and pumped to a surge tank for storage. When the regeneration system can receive the spent activated carbon, additional water is used to pump the spent activated carbon from the storage tanks through a series of surge tanks and dewatering screens to a thermal dryer, wherein the spent activated carbon is dried before being reactivated in a kiln. After regeneration, the activated carbon is normally stored in another surge bin system before being loaded into a bulk trailer and transported back to the adsorption site.

The use of water slurries to transfer carbon in activated carbon regeneration systems causes several problems. For example, the water used to form the slurries and transport the carbon must be treated in an environmentally sound manner. This water treatment requires equipment, thus adding to capital costs. The carbon handling and water treatment equipment in a conventional activated carbon regenerated system often amounts to about 25 percent of the total capital costs of the conventional activated carbon regeneration system. There has been a desire to cut these costs because the carbon handling and water treatment equipment is not directly involved in the activated carbon regeneration process. In addition to the high capital cost, the carbon handling and water treatment portion of a conventional activated carbon regeneration system is responsible for a significant amount of operating costs. The operating costs include manpower, the water itself, and energy to move the water and the water-carbon slurries and to dry the carbon. Furthermore, relatively fine activated carbon particles are lost through the dewatering screens in the carbon handling portion of a conventional regeneration system. The mechanical agitation involved in the slurry handling causes breakdown of the activated carbon particles, further magnifying the problem. The lost carbon must then be replaced with new carbon, which further adds to the overall cost of the process.

Another problem with the use of water as a transport medium in conventional regeneration systems is the difficulty in tracking the carbon as it is run through the slurry system, making compliance with environmental regulations more difficult. As set forth above, one must take care not to allow carbon containing hazardous waste to mix with and contaminate other carbon. One must also take care not to allow water leakage from the system. When hazardous wastes are involved, slurry water leaks can become a serious environmental control problem.

Therefore, there is a need for an activated carbon regeneration system with a simplified carbon handling scheme so that activated carbon can be more economically regenerated and environmental regulations associated with activated carbon regeneration can be more effectively achieved.

SUMMARY OF THE INVENTION

The present invention solves the above-described problems by providing a method for regenerating at least partially spent activated carbon wherein the at least partially spent activated carbon is fed from a portable container to the heating zone of a thermal regeneration system without the use of liquid, such as water, to transport the activated carbon. As used herein, the term "heating zone" means the portion of an activated carbon regeneration system wherein the activated carbon is heated for the purpose of drying the activated carbon, regenerating the activated carbon, or both.

By eliminating a liquid slurry handling system, the method of the present invention provides a simplified and more economical activated carbon regeneration system by reducing capital and operating costs, carbon loss, carbon breakdown, and contamination of carbon and the environment. Specifically, by eliminating the need for water slurry handling of the activated carbon, the present invention makes compliance with environmental regulations easier because less water treatment is needed, and because it is easier to keep batches of spent carbon separated.

More specifically, the method of the present invention includes the steps of: (a) containing at least partially spent activated carbon which has been substantially drained of liquid in a portable container; (b) feeding the at least partially spent activated carbon from the portable container directly to an activated carbon heating zone without the use of liquid to transport the at least partially spent activated carbon to the heating zone; and (c) regenerating the at least partially spent activated carbon in the heating zone.

Still more specifically, the steps of feeding the activated carbon to the heating zone includes the step of feeding the activated carbon from the portable container directly to either a dryer or a kiln.

Even more specifically, the step of feeding the at least partially spent activated carbon from the portable container to the heating zone includes the steps of: (1) positioning the portable container adjacent a conveyor; (2) dispensing the at least partially spent activated carbon from the portable container directly onto the conveyor; and (3) transferring the at least partially spent activated carbon with the conveyor to the dryer or, in the alternative, to the kiln.

The step of dispensing the at least partially spent activated carbon from the portable container in the method of the present invention preferably includes the steps of inserting an auger through an opening in the portable container and rotating the auger so as to withdraw the at least partially spent activated carbon from the portable container. Further, the step of dispensing the spent activated carbon includes the steps of: (1) orienting the portable container in a predetermined orientation to collect the at least partially spent activated carbon at a particular location within the portable container; and (2) inserting the auger through the opening in the portable container to the particular location; and (3) rotating the auger to withdraw the at least partially spent activated carbon from the particular location within the portable container. The predetermined location is preferably located proximate the bottom of the portable container after the step of orienting the portable container, so that the at least partially spent activated carbon is forced by gravity towards the auger.

The method of the present invention preferably includes the use of a heating zone having both a dryer and a kiln. The at least partially spent activated carbon is preferably fed directly from the portable container to the dryer and then directly from the dryer to a kiln. The at least partially spent activated carbon is then regenerated in the kiln.

In a still more preferred embodiment of the method of the present invention, the activated carbon contained in the portable container is used in an adsorption system, and the portable container defines a filter chamber of the adsorption system. The portable container is also used to transport the carbon from an adsorption site to the regeneration site. The carbon is preferably substantially drained of liquid before it is transported. In addition, the activated carbon, once regenerated, is preferably reloaded into the same portable container in which it was delivered or in another identical container for transporting the regenerated carbon back to the adsorption site.

The present invention also contemplates a multi-purpose container for use in the foregoing method. This container can be used to hold the activated carbon during an adsorption process using the activated carbon as an adsorber, during storage of the activated carbon at an adsorption site, during transportation of the activated carbon between the adsorption site and a regeneration site, and during storage of the activated carbon at the regeneration site. The portable container of the present invention eliminates the need for spent activated carbon storage bins at the adsorption site and the regeneration site and also eliminates the need for a complicated spent activated carbon transfer system at both the adsorption site and the regeneration site. The spent activated carbon can simply stay in the portable container through adsorption, transportation, and storage until it is fed from the container to the regeneration system. This greatly reduces the need for water which is normally used to transfer the spent activated carbon in the form of carbon water slurries. Segregating spent activated carbon in its own container also makes it easier to track the spent activated carbon from the adsorption site through regeneration and then back to the adsorption site. Moreover, the multi-purpose portable container of the present invention substantially reduces capital and operating costs for activated carbon regeneration.

The multi-purpose portable container of the present invention includes: (a) a shell defining a filter chamber for holding activated carbon, the shell including a first end wall and a side wall extending from the first end wall; (b) an activated carbon inlet in the shell for receiving activated carbon into the chamber to form a bed of activated carbon in the chamber; (c) a first fluid inlet in the shell for receiving fluid to be filtered through the activated carbon bed; (d) a first fluid outlet in the shell for dispensing fluid filtered through the activated carbon bed so that fluid can flow continuously through the activated carbon bed while the container is in the adsorption process; (e) a tunnel defining an outlet in the shell for dispensing the activated carbon from the chamber the tunnel being adapted to receive an auger which when rotated dispenses activated carbon from the container; and (f) a support frame for receiving container lifting means, mounting the container on container transportation means, and stabilizing the container during handling and transportation of the container.

More specifically, the activated carbon outlet tunnel of the present invention is preferably positioned proximate the first end wall so that when the container is oriented with the first end wall and the activated carbon outlet tunnel positioned approximately below the chamber, the activated carbon in the chamber is forced by gravity to the activated carbon outlet tunnel.

Other preferred features of the multi-purpose container of the present invention include a second fluid outlet proximate the second end wall for dispensing fluid from within the chamber before the container is removed from the adsorption process and before the container is transported.

Still another preferred feature is a gas inlet for receiving gas into the chamber for forcing fluid out of the chamber preferably through the activated carbon outlet tunnel. This allows the weight of the container to be reduced before transportation and further allows for drying of the container contents before the activated carbon is introduced into the regeneration system.

Preferably, the container of the present invention is also adopted for use in conventional activated carbon regeneration systems wherein a carbon water slurry handling system is used. In this embodiment, the gas inlet means is positioned distal from the first end wall and the container includes a second liquid inlet proximate the first end wall. Accordingly, when the first end wall is positioned below the chamber, liquid can be introduced proximate the first end wall to form a liquid carbon slurry in the chamber, and thereafter, gas can be introduced into the container distal from the first end wall, whereby the slurry is discharged through a third liquid outlet proximate the first end wall and the activated carbon is discharged from the chamber.

Still another feature of the present invention is an activated carbon filter operatively associated with a device which releases pressure within the shell of the container when the pressure within the shell exceeds a predetermined amount. The pressure releasing device releases gas contained within the shell, and the activated carbon filter filters the gas released through the pressure releasing device.

Yet another feature of the multi-purpose container of the present invention is a fluid flow distributor operatively associated with the first fluid outlet of the container for distributing fluid flow substantially evenly across the activated carbon bed in the container when the fluid flow through the activated carbon bed is reversed for backwashing the activated carbon bed.

Therefore, it is an object of the present invention to provide an improved method of regenerating spent activated carbon.

It is another object of the present invention to provide a simplified and more efficient method of regenerating spent activated carbon.

Another object of the present invention is to provide a method of regenerating activated carbon that is more economical.

Yet another object of the present invention is to provide a method of regenerating activated carbon that reduces the amount of required equipment.

It is still another object of the present invention to provide a method of regenerating spent activated carbon that makes compliance with environmental regulations easier.

Still another object of the present invention is to provide a method for regenerating spent activated carbon wherein the likelihood of environmental damage is reduced.

Another object of the present invention is to provide a method of regenerating spent activated carbon wherein the likelihood of carbon contamination is reduced.

A further object of the present invention is to provide a method of regenerating spent activated carbon which facilitates keeping track of the location of the carbon.

Still another object of the present invention is to provide an improved activated carbon container that helps achieve the foregoing objects.

Other objects, features, and advantages will become apparent from reading the following specification in conjunction with the accompanying drawings.

DETAILED DESCRIPTION

Figure 1:
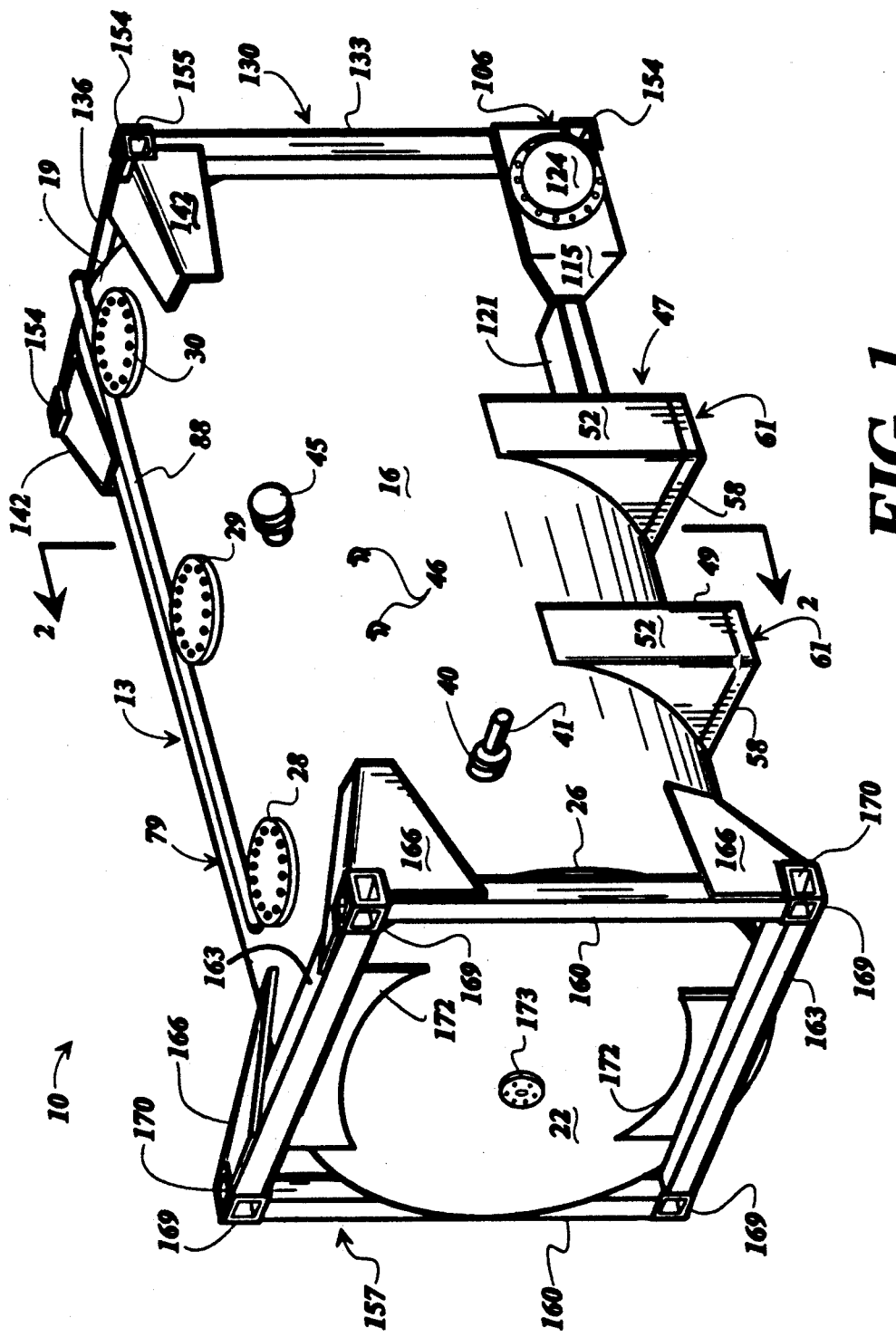
FIG. 1 is a perspective view of a preferred embodiment of the container of the present invention.
Figure 2:
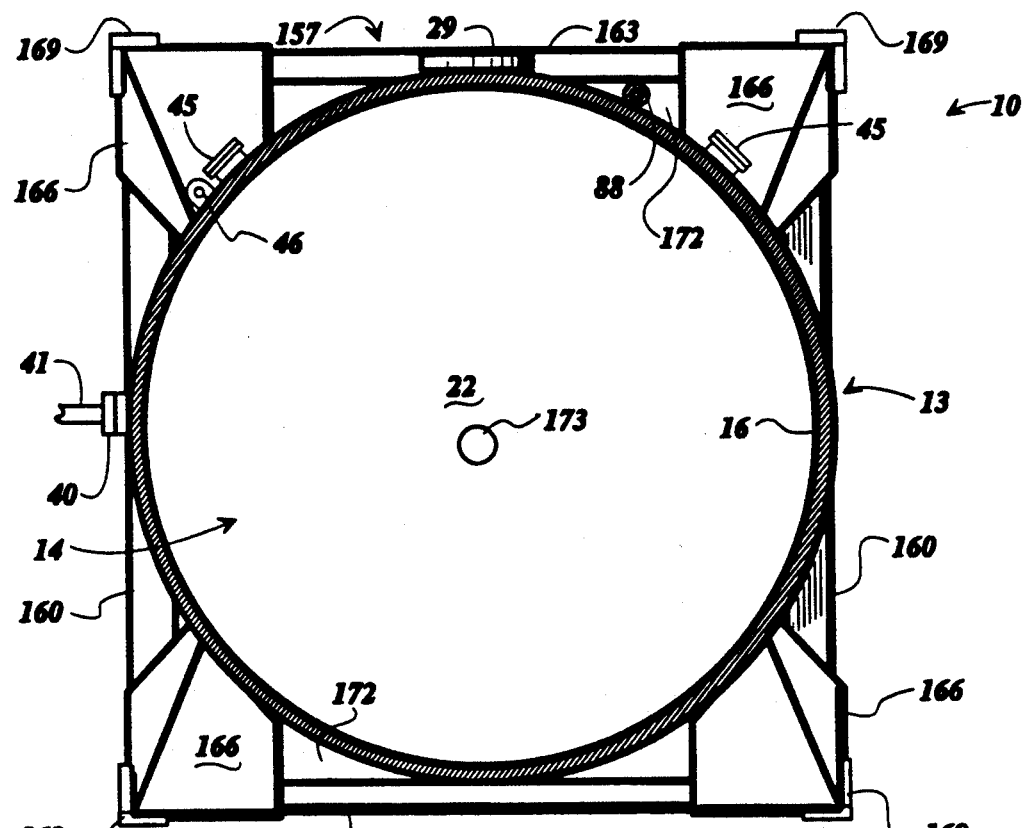
FIG. 2 is a section view of the container shown in FIG. 1 taken along line 2—2 with the central support brackets deleted.
Figure 3:
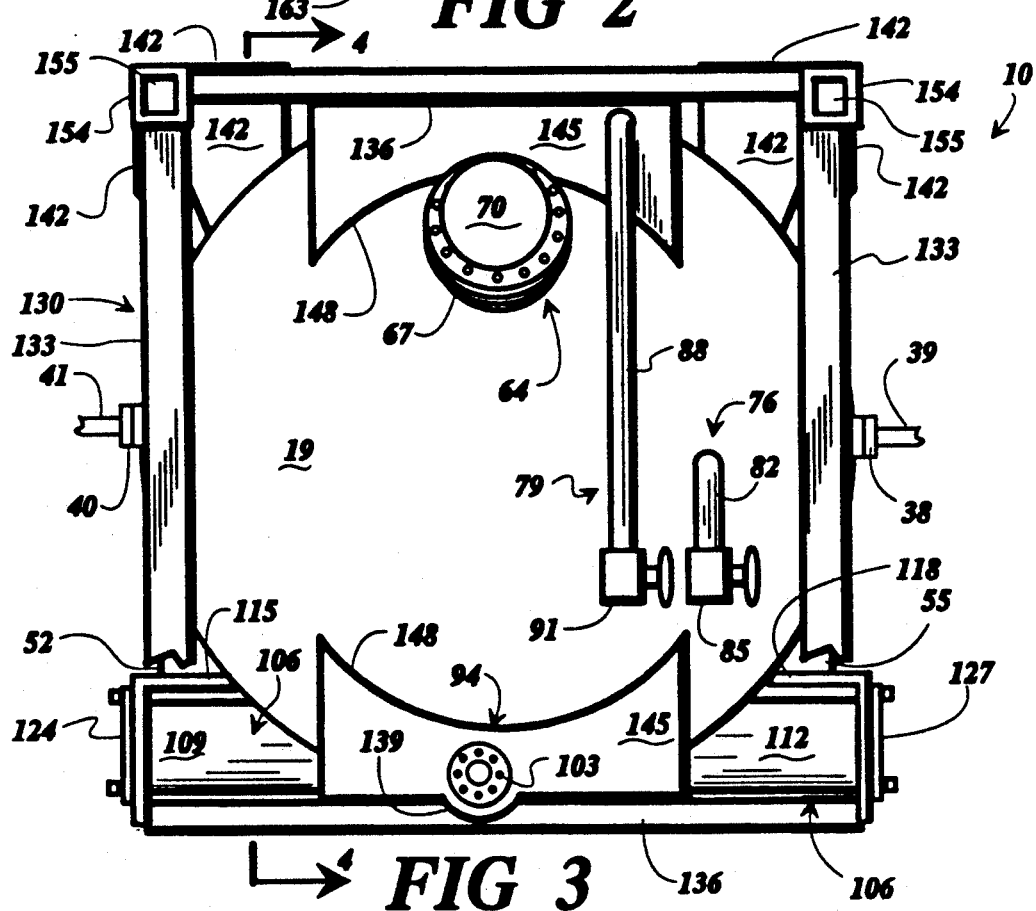
FIG. 3 is an elevational view of one end of the container shown in FIG. 1.

The present invention encompasses both a method for regenerating spent activated carbon and an activated carbon container for use in that method. A preferred embodiment 10 of the container of the present invention is shown in FIGS. 1-8. The container 10 includes a container shell 13 which defines an interior activated carbon chamber 14. The chamber 14 is exposed in FIG. 6. The container shell 13 includes a cylindrical side wall 16 that extends between opposing first and second dished end walls 19 and 22. The second end wall 22 is best shown in FIG. 3. The first and second end walls 19 and 22 meet the opposite ends of the cylindrical side wall 16 to form respective circumferential abutments 25 and 26. The first and second end walls 19 and 22 are preferably welded to the cylindrical side wall 16 along the respective circumferential abutments 25 and 26.

The cylindrical side wall 16 includes three activated carbon inlets 28, 29 and 30 for receiving activated carbon into the chamber 14 of the container 10 to form a carbon bed 32 therein. The carbon bed 32 is partially exposed in FIG. 6. The activated carbon inlets 28, 29 and 30 are spaced from one another along the top of the shell 13 as shown in FIG. 1, and aligned along the longitudinal axis of the container 10. One carbon inlet 28 is located proximate the second end wall 22, one carbon inlet 29 is located in the middle of the cylindrical side wall 16, and the other carbon inlet 30 is located proximate the first end wall 69. Each of the carbon inlets 28, 29, and 30 is covered by a removable cover plate.

Figure 6:
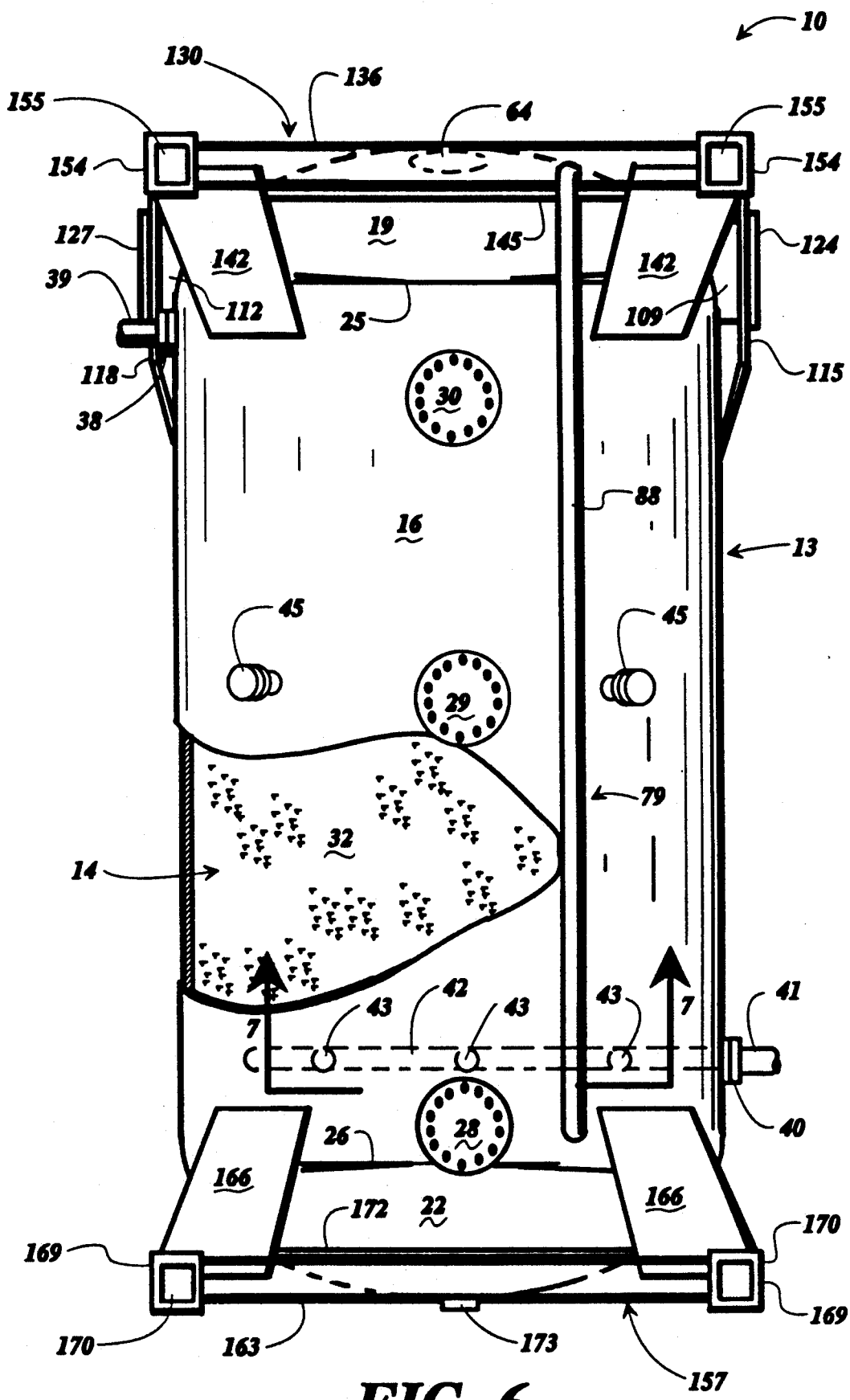
FIG. 6 is a partial cutaway side elevation view showing the container of FIG. 1 in a vertical position with a carbon bed inside.

The container shell 13 also includes a liquid inlet coupling 38 that fits around an opening in the cylindrical side wall 16. The liquid inlet coupling 38 can be connected to a pipe 39 of an adsorption apparatus as shown in FIG. 6 for directing liquid into the chamber 14 of the container shell 13. The liquid inlet coupling 38 is preferably positioned proximate the first end wall 19 which is the top of the container 10 when the container 10 is positioned vertically as shown in FIG. 6. In addition, the cylindrical side wall 16 includes a liquid outlet coupling 40 positioned proximate the second end wall 22 of the container shell 13. The liquid outlet coupling 40 fits about an opening in the cylindrical side wall 16 at a location opposite the inlet coupling 38 and proximate the second end wall 22 and is used to connect the chamber 14 of the container shell 13 to a liquid outlet pipe 41 of an adsorption apparatus. This is best shown in FIG. 6. The liquid outlet pipe 41 discharges liquid from the chamber 14 of the container shell 13 so that liquid can flow through the activated carbon bed in the container shell chamber 14. When positioned vertically, liquid flows through the inlet pipe 39, through the activated carbon bed 32, and then out of the container shell chamber 14 through the outlet pipe 41.

Figure 7:
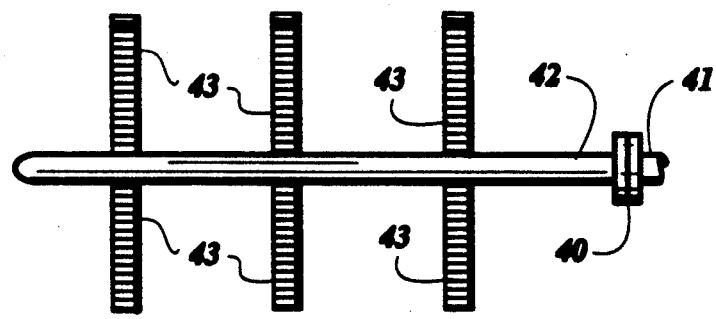
FIG. 7 is a plan view of the flow distribution headers proximate the lower end of the container shown in FIG. 6.
Figure 8:
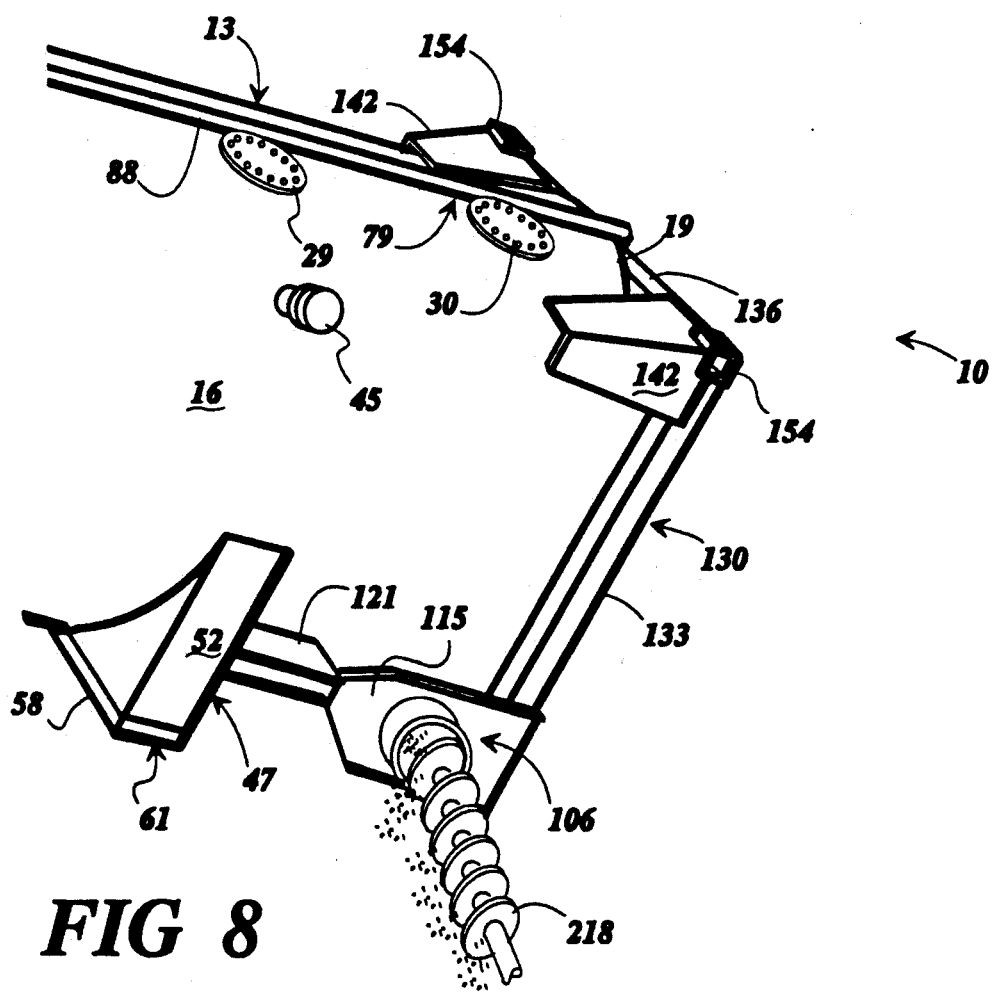
FIG. 8 is a partial perspective view of the container shown in FIG. 1 illustrating an auger removing carbon from within the container.

Referring now to FIGS. 6 and 7, the outlet pipe 41 is connected with the liquid outlet coupling 40 to another pipe 42 that extends from the outlet coupling into and laterally across the chamber 14 towards the opposite side of the cylindrical wall 16. Lateral headers 43 extend outwardly from both sides of the pipe 42 towards the inner surface of the cylindrical wall 16. The lateral headers are imbedded in the activated carbon bed 32 and receive the liquid flow during the adsorption process. The lateral headers 43 also distribute liquid flow through the activated carbon bed 32 when the liquid flow through the adsorption bed is reversed during backwashing of the activated carbon bed.

The container shell 13 also includes a pair of vacuum-/overpressure breakers 45 spaced from one another on opposite sides of the cylindrical side wall 16. Each vacuum/overpressure breaker 45 is positioned about 45 degrees from the top of the cylindrical side wall 16 as shown in FIG. 2. The vacuum/overpressure breakers release pressure within the container shell 13 when the pressure within the container shell exceeds a predetermined amount. The vacuum/overpressure breakers 45 include an activated carbon filter that filters the gas that is released. In addition to releasing pressure, the vacuum/overpressure breakers 45 also admit air into the container shell chamber 14 when the vacuum within the chamber exceeds a predetermined amount. Accordingly, the vacuum/overpressure breakers 45 prevent explosion or implosion of the container shell 13. When hazardous wastes are involved, this feature is very advantageous.

The container shell 13 further includes a pair of ladder pad eyes 46 attached to the outer surface of the cylindrical side wall 16 and spaced from one another below one of the centrally located activated carbon inlet 29. The ladder pad eyes 46 anchor a step ladder when the container 10 is in the horizontal position shown in FIG. 1.

First and second U-shaped central support frames 47 and 49 are attached to the cylindrical side wall 16 and spaced from one another to support the bottom of the container 10 during lifting of the container with a forklift. Each of the central support frames 47 and 49 include a pair of arc-shaped brackets 52 and 55 that extend downwardly from the midsection of the cylindrical side wall as shown in FIG. 1. The arc-shaped brackets 52 and 55 are welded to the outer surface of the cylindrical side wall 16. Each of the pair of brackets 52 and 55 are welded at their lower ends to opposite ends of respective horizontal beams 58 which are aligned. Fork lift pockets 61 are formed at each end of the horizontal beams 58.

Figure 4:
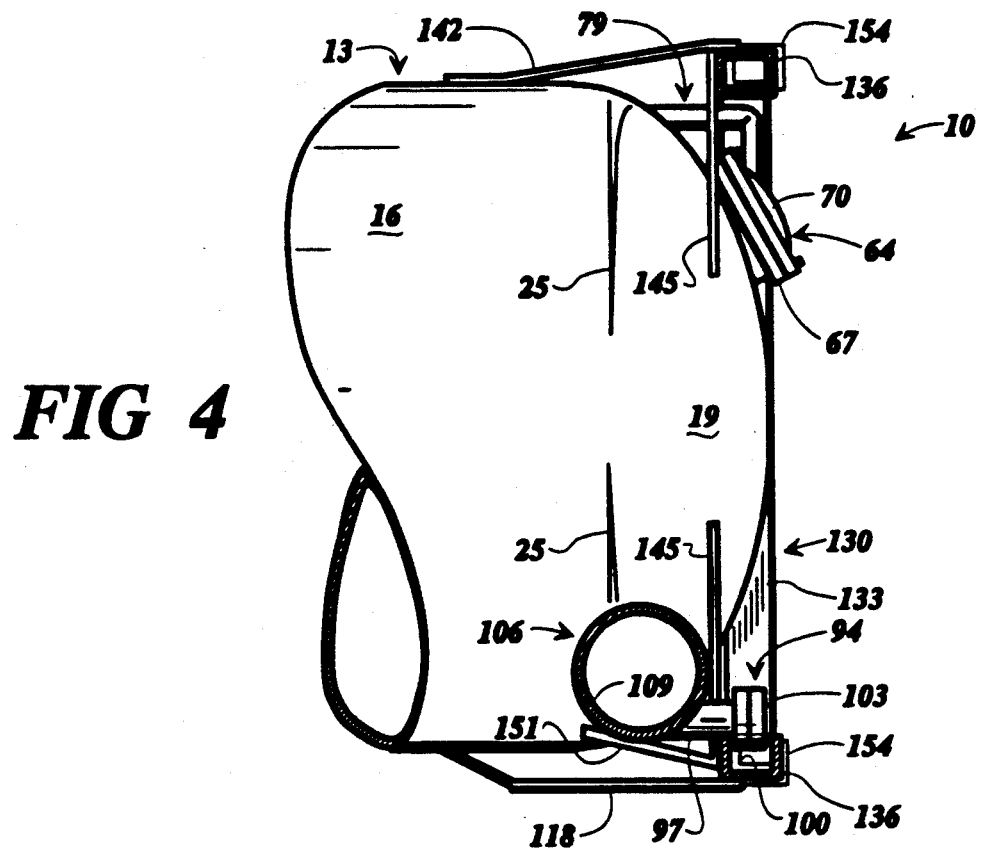
FIG. 4 is a partial section view of the container shown in FIG. 1.
Figure 5:
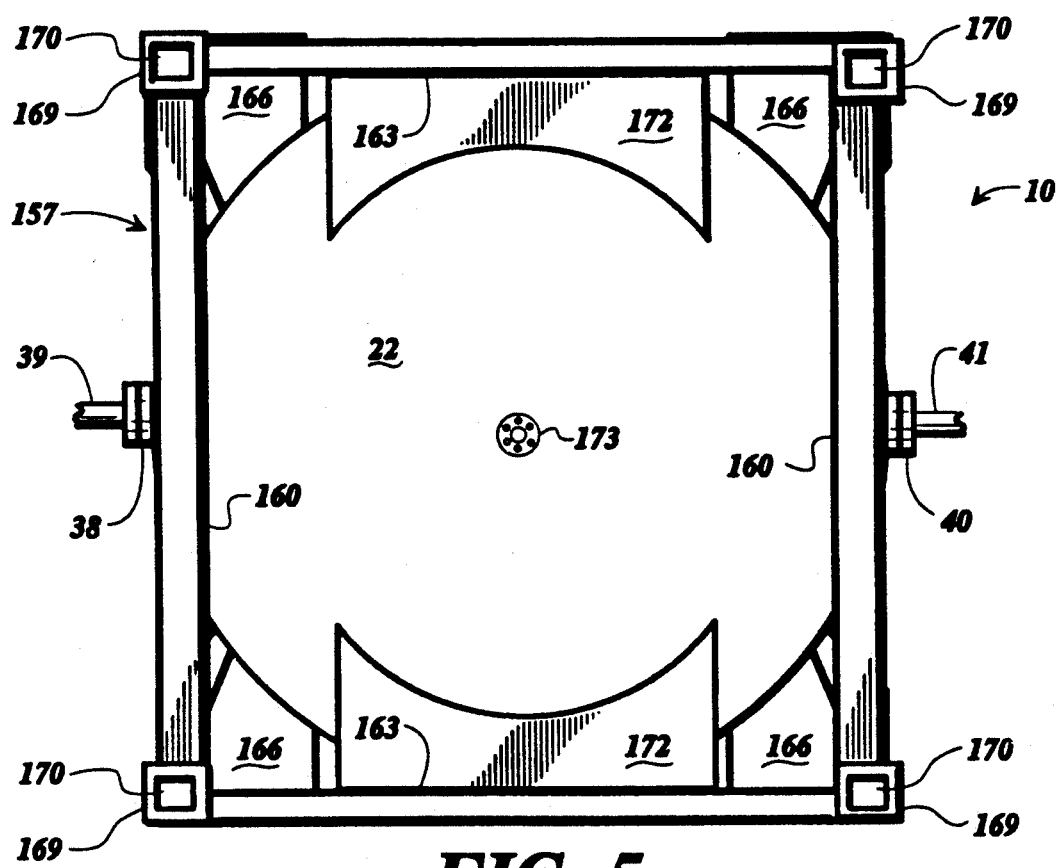
FIG. 5 is an elevational end view of the container shown in FIG. 1 showing the opposite end of that shown in FIG. 3.

The first end wall 19 includes a manhole 64 positioned proximate the top of the end wall as shown in FIGS. 3 and 4. The manhole 64 provides access to the chamber 14 of the shell 13 for maintenance of the container 10. The manhole 64 includes a manhole reinforcement ring 67 surrounding a hole in the first end wall 19. A cover plate 70 is removably fastened to the manhole reinforcement ring 67 with bolts.

The container 10 includes a second liquid inlet 76 that injects liquid, such as water, through the first end wall 19 into the chamber 14 of the container for removing activated carbon from the container. A gas inlet line 79 injects gas into the chamber 14 through the cylindrical side wall 16 proximate the second end wall 22. The second liquid inlet 76 includes a pipe 82 that extends from the opening in the first end wall and then downwardly to a ball valve 85 as shown in FIG. 3. The ball valve 85 can be connected to a source of liquid. The gas inlet line 79 includes a pipe 88 that extends from the opening in the cylindrical side wall 16 proximate the second end wall 22 towards the first end wall 19, along the cylindrical side wall 16, and then down the first end wall to another ball valve 91 positioned proximate the ball valve 85 of the second liquid inlet 76. This second ball valve 91 can be connected to a source of pressurized gas.

A third liquid outlet 94 extends outwardly from the bottom periphery of the first end wall 19 as shown in FIGS. 3 and 4. The third liquid outlet 94 includes a pipe 97 that extends outwardly from an opening in the first end wall 19 substantially parallel to the cylindrical side wall 16 to an outer end that defines an exit opening. A flange 100 surrounds the exit opening of the third liquid outlet 94 and a butterfly valve 103 is bolted to the flange for controlling the flow through the third liquid outlet 94.

An auger tube 106 extends across the bottom portion of the container 10 along the first circumferential abutment 25 between the cylindrical side wall 16 and the first end wall 19. The auger tube 106 is located adjacent the third liquid outlet 94. The auger tube 106 provides access to the chamber 14 within the container shell 13 for removal of the activated carbon therein. The auger tube 106 includes first and second pipes 109 and 112 coaxially aligned and welded to the container shell 13 about holes in opposite sides of the container shell. The first and second pipes 109 and 112 are aligned to form a tunnel through the chamber 14.

The first pipe 109 of the auger tube 106 extends from the container shell 13 outwardly and through a hole in a first corner bracket 115. The first corner bracket 115 has an L-shaped cross section as shown in FIG. 3 and extends outwardly from the cylindrical side wall 16 and then downwardly around the auger tube 106. The upper leg of the first corner bracket 115 is welded to the outer surface of the cylindrical side wall 16. Likewise, the second pipe 112 of the auger tube 106 extends through a second corner bracket 118 which is attached to the opposite side of the cylindrical side wall 16 in the same manner as the first corner bracket 115. An elongated brace 121 extends inwardly from each of the first and second corner brackets 115 and 118 along the length of the cylindrical side wall 16. Each elongated brace 121 is welded to the outer surface of the cylindrical side wall 16.

Cover plates 124 and 127 are removably fastened to each of the first and second corner brackets 118 and 121 to seal the auger tube 106. A removable dewatering screen (not shown) is preferably placed in the auger tube just behind one of the cover plates 124 and 127 so that liquid can be drained from the container 10 before inserting the auger within the auger tube 106.

The first and second corner brackets 115 and 118 form part of the first end wall support frame 130. The first end wall support frame 130 also includes a pair of elongated corner posts 133 welded to and extending upwardly from the respective first and second corner brackets 118 and 121. A pair of elongated cross members 136 extend between respective ends of the corner posts 133 to form a square-shaped frame. The lower cross member 136 has a centrally located indention 139 to receive the lower portion of the third liquid outlet 94. V-shaped corner braces 142 extend from the upper corners of the first end support frame 130 to the cylindrical side wall 16 and are welded to the cylindrical side wall, the upper cross member 136 and the two elongated corner posts 133. A pair of end brackets 145 extend inwardly from each cross member 136 to the first end wall 19. Each end bracket 145 has a crescent-shaped inner edge 148 which is welded to the first end wall 19. The opposite edge of each end bracket 145 is welded to the respective cross member 136. A pair of auger tube brackets 151 extend from opposite ends of the lower cross member 136 to the underside of the respective auger tube pipes 109 and 112. Corner castings 154 fit over the corners where the corner posts 133 and cross members 136 meet to reinforce the first end frame 130. The corner castings 154 have holes 155 in each face for receiving container lifting means such as the hook at the end of a hoist cable. The holes 155 also receive standardized means well known to those skilled in the art for locking the container 10 on a transportation vehicle chassis.

The container 10 has a second end support frame 157 that includes a pair of parallel, spaced, elongated corner posts 160 and a pair of elongated cross members 163 extending between the ends of the corner posts to form a square frame. The second end support frame 157 also includes V-shaped corner braces 166 that extend from each corner where the corner posts 160 and cross members 163 meet. The V-shaped corner braces extend from the corners of the second support frame 157 to the cylindrical side wall 16. The V-shaped cross braces 166 are welded to the cylindrical side wall 16, the corner posts 160 and the cross members 163. Corner castings 169 are welded to each corner of the second end support frame 157 to further stabilize the second end support frame. The corner castings 169 of the second end support frame 157 also have holes 170 that function in the same manner as the holes 155 in the corner castings 154 of the first end support frame 130. A pair of end brackets 172 identical to the end brackets 145 extend from respective cross members 163 to the second end wall 22. The end brackets 172 are welded to both the cross members and the second end wall 22.

The second end wall 22 includes a second fluid outlet 173 for draining liquid from the container 10 before the container is removed from the adsorption process and transported.

It should be understood by those skilled in the art that each of the inlets and outlets of the container 10 is sealed with gaskets or the like so that the container does not leak.

The container 10 is a multi-purpose container for holding activated carbon and can be used to hold the activated carbon during an adsorption process when the activated carbon in the container is used to adsorb materials from liquid flowing through the container, during storage of the activated carbon and during transportation of the activated carbon between an adsorption site and a regeneration site. The container 10 is first filled with new or regenerated activated carbon by feeding dry activated carbon through the activated carbon inlets 28, 29 and 30 on top of the container shell 13 while the container 10 is in the horizontal position shown in FIG. 1. The container 10 is preferably not completely filled so that there is a space above the activated carbon. The container 10 can then be lifted with a forklift using the forklift pockets 61 or with a hoist using the holes 155 and 170 in the corner castings 154 and 169 onto a vehicle such as a tractor trailer for transportation to an adsorption site. The first and second end support frames 130 and 157 provide support for the container 10 during handling and transportation.

At the adsorption site, the container is positioned vertically as shown in FIG. 6 and fitted into an adsorption system. The activated carbon settles within the container 10 to form an activated carbon bed 32 within the chamber 14. An inlet pipe 39 is connected to the inlet coupling 38 and an outlet pipe 41 is connected to the outlet coupling 40. During the adsorption process, liquid is flowed through the inlet pipe 39, into the chamber 14, through the activated carbon bed 32, and out the outlet pipe 41. The activated carbon separates undesirable materials from the liquid flowing therethrough.

Eventually, the activated carbon in the container 10 becomes spent and must be regenerated. At that time, liquid flow through the container 10 is stopped and the liquid in the container is first drained through the first liquid outlet 41. Liquid remaining in the bottom of the container is then drained through the third liquid outlet 173. The third liquid outlet 173 preferably has a dewatering screen (not shown) therein to prevent the activated carbon from escaping while water is drained through the third liquid outlet. After the liquid in the chamber 14 has been drained, the inlet and outlet pipes 39 and 41 are disconnected from the inlet and outlet couplings 38 and 40 and the liquid inlet and outlets are capped. The container 10 is then removed from the adsorption process. If desired, the container 10 can be inverted for the removal of additional liquid from the container. One of the cover plates 124 and 127 sealing the auger tunnel 106 is removed with a dewatering screen left in the opening. Gas may then be forced through the container 10 by injecting gas through the second gas inlet line 76. The gas forces liquid entrained in the activated carbon bed 32 out through the open end of the auger tunnel 106. After the weight of the container has been reduced to an acceptable amount, the auger tunnel cover plate 124 or 127 is bolted back over the auger tunnel opening and the container 10 can be moved to storage or directly to a tractor trailer for shipment to a regeneration site. At the regeneration site, the container of spent activated carbon can be stored as is or can be taken directly to the regeneration system.

Figure 9:
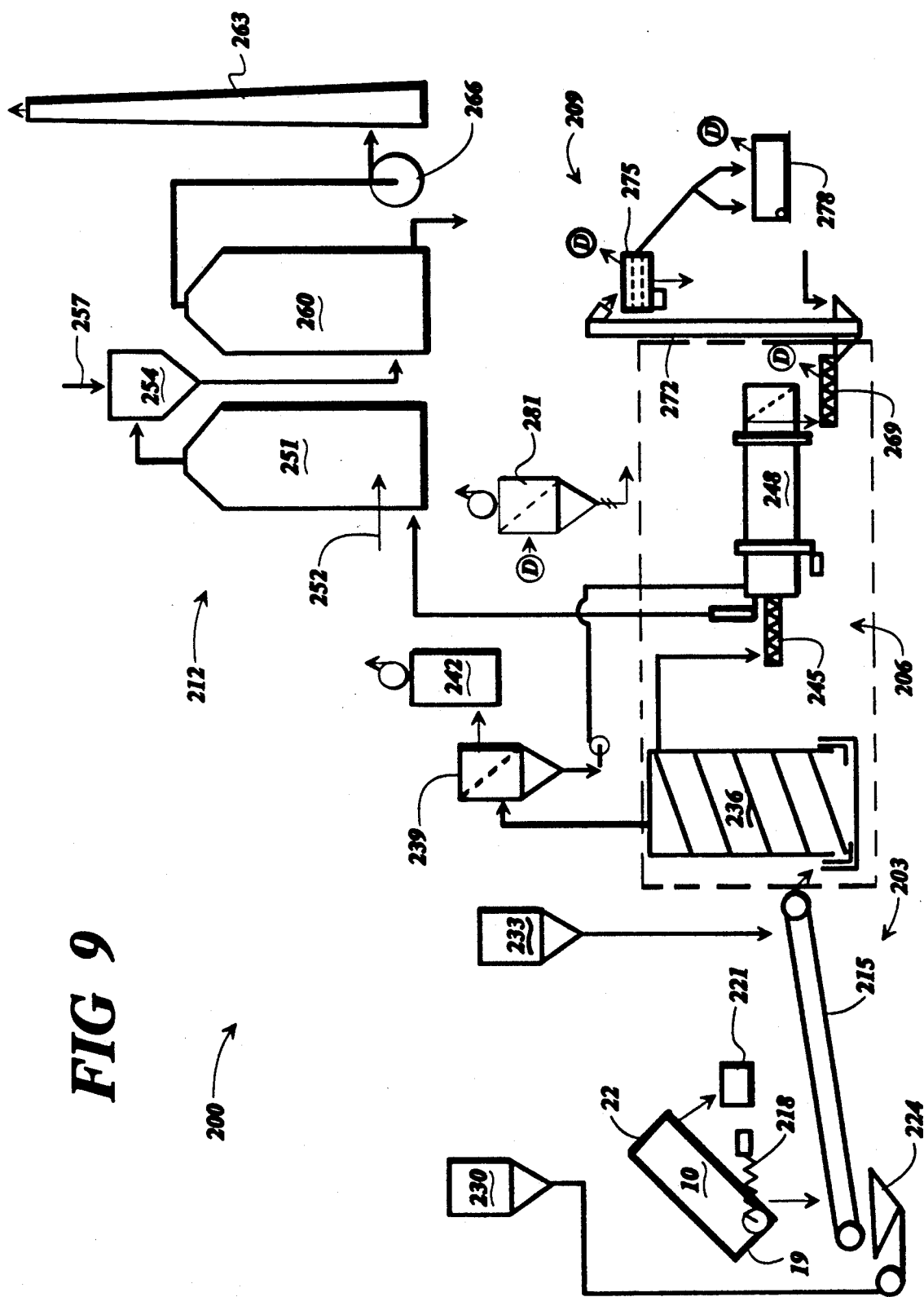
FIG. 9 is a schematic diagram of a preferred embodiment of the method of the present invention for regenerating spent activated carbon.

A preferred embodiment 200 of the regeneration system of the present invention is shown in FIG. 9. The regeneration system 200 includes a spent activated carbon handling system 203, a heating zone 206, a regenerated activated carbon handling system 209, and a effluent treatment system 212.

The spent activated carbon handling system 203 includes a belt conveyor 215 for delivering spent activated carbon to the thermal regeneration system 206. The container 10 of spent activated carbon is positioned above the conveyor and tilted or oriented so that the second end wall of the portable container is positioned higher than the first end wall and the auger tube is positioned underneath the container and approximately below the chamber 14. A hydraulic lifter 221, such as a tipkit sold under the name TAMPLIN by Tamplin Engineering Ltd. in England, is used to hydraulically lift the second end of the container. One of the auger tube cover plates 124 and 127 is removed and a reciprocating auger 218 is inserted into the auger tube 106 and rotated for removing the spent activated carbon from the chamber. The spent activated carbon removed by the auger 218 is then deposited directly on top of the conveyor 215.

A carbon overflow and liquid collection funnel 224 is located beneath the conveyor to collect any carbon that falls off the conveyor and any liquid that drips through the conveyor. This overflow material is transferred to a carbon upflow filter so that the carbon can be separated and removed.

A tote bin 233 is used for adding additional dry spent carbon to the downstream end of the conveyor. This additional carbon along with the spent activated carbon deposited directly from the container 10 onto the conveyor 215 is delivered directly by the conveyor to a dryer 236 in the heating zone 206. Residual liquid is removed from the spent activated carbon by the dryer 236. Gaseous effluent is transferred from the dryer 236 to a dust collector 239 that separates the carbon particles entrained in the effluent gas. The dust collector 239 is preferably a cartridge filter as known to those skilled in the art. The separated carbon is added back to the regeneration system, and the gaseous effluent is transferred from the dust collector 239 to a carbon filter 242 to clean the gas before releasing the gas into the environment. The dried spent activated carbon from the dryer 236 and the dust collector 239 is transferred directly to another conveyor 245 which feeds the dried spent activated carbon directly to a counterflow rotary regeneration kiln 248. The spent activated carbon is heated to temperatures between 800° and 1000° C. in the presence of steam in the kiln 248 to regenerate the spent activated carbon. Gaseous effluent from the rotary kiln is transferred to the effluent treatment system 212.

Specifically, the gaseous effluent from the rotary kiln 248 is directed through an afterburner 251 into which a fuel is injected through a gas inlet 252, then through a quench tank 254 into which quench water is added through water inlet 257, then through a gas scrubber 260 and lastly to a stack 263. The gaseous effluent is delivered to the stack with a fan 266. The gaseous effluent is released to the atmosphere through the stack 263.

The regenerated activated carbon is fed from the rotary kiln 248 with a conveyor 269 to an elevator 272. The elevator 272 takes the regenerated activated carbon to a screen 275 for separating out fines. The regenerated activated carbon is then transferred directly to a portable container 278 which can be the same container in which the activated carbon was delivered to the regeneration site or can be a second identical container. Dust collectors 281 are preferably positioned at the conveyor 269 to the elevator 272, the screen 275 and the portable container 278 as indicated by the reference letter D to limit dispersal of the activated carbon in the environment. One of the dust collectors 281 is illustrated separately in FIG. 9 for clarity. The dust collectors 281 are also preferably cartridge filters.

The regenerated activated carbon can be stored in the portable container 278 or immediately transported back to the adsorption site where the container can be stored or immediately reinstalled in the adsorption system.

As an alternative method for removing activated carbon from the container, water is introduced into the chamber 14 of the shell 13 through the second liquid inlet 76 to form a carbon-water slurry with the carbon in the container, and then, gas is introduced into the chamber through the gas inlet 79 thereby forcing the slurry out the third liquid outlet 94 and into a surge bin. This method is used to fill stationary adsorbers with fresh or regenerated activated carbon.

In an alternative embodiment of the present invention, the spent activated carbon is auger fed directly from the portable container to the rotary kiln. The activated carbon in the portable container is preferably substantially dry before being fed directly into the kiln. This further reduces the complexity of the regeneration process.

It should be understood that the foregoing relates only to preferred embodiments of the present invention, and that numerous changes and modifications may be made therein without departing from the spirit and scope of the invention as defined in the following claims.

I claim:

1. Method of regenerating at least partially spent activated carbon used in an adsorption system, the at least partially spent activated carbon being contained in a portable container defining a filter chamber of the adsorption system, the portable container having a fluid inlet and a fluid outlet connected to the adsorption system so that fluid flows through the fluid inlet into the filter chamber and out of the filter chamber through the fluid outlet, the portable container being sealed so that fluid does not leak from the container, the method comprising the steps of:

disconnecting the portable container from the adsorption system;

covering the fluid inlet and outlet so that the at least partially spent activated carbon is held within the portable container;

transporting the portable container containing the at least partially spent activated carbon from the adsorption site to a regeneration site remote from the adsorption site;

at the regeneration site, feeding the at least partially spent activated carbon from the portable container directly to an activated carbon heating zone without the use of liquid to transport the at least partially spent activated carbon to the heating zone, wherein the step of feeding includes the steps of inserting an auger through an opening in the portable container and rotating the auger so as to withdraw the at least partially spent activated carbon from the portable container; and regenerating the at least partially spent activated carbon in the heating zone.

2. Method as in claim 1, further comprising the step of draining liquid from the at least partially spent activated carbon before the step of transporting the portable container to the regeneration site.

3. Method as in claim 1 further comprising the steps of feeding the regenerated activated carbon from the thermal regeneration system to a portable container and transporting the portable container holding the regenerated activated carbon back to the adsorption site.

4. A method as in claim 1, wherein the feeding step comprises the step of feeding the at least partially spent activated carbon from the portable container directly to a dryer in the heating zone.

5. Method as in claim 4, wherein the feeding step comprises the steps of:

positioning the portable container adjacent a conveyor;

dispensing the at least partially spent activated carbon from the portable container directly onto the conveyor; and transporting the at least partially spent activated carbon with the conveyor directly to the dryer.

6. A method as in claim 5, wherein the step of dispensing the spent activated carbon comprises the steps of:

orienting the portable container in a predetermined orientation to collect the at least partially spent activated carbon at a particular location within the portable container;

inserting the auger through an opening in the portable container to the particular location; and rotating the auger to withdraw the at least partially spent activated carbon from the particular location within the portable container.

7. A method as in claim 6, wherein the predetermined location is located proximate the bottom of the portable container when the portable container is oriented in the predetermined orientation so that the at least partially spent activated carbon is forced by gravity towards the auger.

8. Method as in claim 1 wherein the step of feeding the at least partially spent activated carbon includes the step of feeding the at least partially spent activated carbon directly from the portable container to a kiln in the heating zone.

9. A method as in claim 8, wherein the feeding step comprises the steps of:

positioning the portable container adjacent a conveyor;

dispensing the at least partially spent activated carbon from the portable container directly onto the conveyor; and transporting the at least partially spent activated carbon with the conveyor directly to the kiln.

10. A method as in claim 9, wherein the step of dispensing the spent activated carbon comprises the steps of:

orienting the portable container in a predetermined orientation to collect the at least partially spent activated carbon at a particular location within the portable container;

inserting the auger through an opening in the portable container to the particular location; and rotating the auger to withdraw the at least partially spent activated carbon from the particular location within the portable container.

11. A method as in claim 10, wherein the predetermined location is located proximate the bottom of the portable container when the portable container is oriented in the predetermined orientation so that the at least partially spent activated carbon is forced by gravity towards the auger.

12. A method as in claim 1, further comprising the steps of:

transferring the at least partially spent activated carbon directly from the dryer to a kiln; and regenerating the at least partially spent activated carbon in the kiln.

* * * * *